United States Patent
Breihan et al.

(10) Patent No.: US 7,416,374 B2
(45) Date of Patent: Aug. 26, 2008

(54) FAST MAKE-UP FATIGUE RESISTANT ROTARY SHOULDERED CONNECTION

(75) Inventors: James W. Breihan, Harris County, TX (US); Andrei M. Muradov, Harris County, TX (US)

(73) Assignee: Grant Prideco, L.P., Houston, TX (US)

( * ) Notice: Subject to any disclaimer, the term of this patent is extended or adjusted under 35 U.S.C. 154(b) by 140 days.

(21) Appl. No.: 10/543,679

(22) PCT Filed: Jan. 29, 2004

(86) PCT No.: PCT/US2004/002540

§ 371 (c)(1), (2), (4) Date: Mar. 16, 2006

(87) PCT Pub. No.: WO2004/070097

PCT Pub. Date: Aug. 19, 2004

(65) Prior Publication Data

US 2006/0222475 A1    Oct. 5, 2006

Related U.S. Application Data

(60) Provisional application No. 60/443,480, filed on Jan. 29, 2003.

(51) Int. Cl.
*F16L 25/00* (2006.01)

(52) U.S. Cl. .................................. 411/411; 285/334
(58) Field of Classification Search ................ 411/411, 411/414; 285/333, 334, 390
See application file for complete search history.

(56) References Cited

U.S. PATENT DOCUMENTS

| | | | | |
|---|---|---|---|---|
| 23,409 A | * | 3/1859 | Thom | 411/411 |
| 1,229,560 A | * | 6/1917 | Whiteman | 411/411 |
| 4,549,754 A | * | 10/1985 | Saunders et al. | 285/334 |
| 4,865,364 A | * | 9/1989 | Nobileau | 285/334 |
| 4,907,926 A | * | 3/1990 | Wing | 411/366.3 |
| 6,290,445 B1 | * | 9/2001 | Duran et al. | 411/423 |
| 6,467,818 B1 | * | 10/2002 | Snapp et al. | 285/334 |
| 6,672,813 B1 | * | 1/2004 | Kajita et al. | 411/411 |
| 6,729,658 B2 | * | 5/2004 | Verdillon | 285/333 |
| 6,848,724 B2 | * | 2/2005 | Kessler | 285/334 |

* cited by examiner

*Primary Examiner*—Flemming Saether
(74) *Attorney, Agent, or Firm*—Browning Bushman P.C.

(57) ABSTRACT

A thread form having improved strength and fatigue resistance. The root of the thread is cut on multiple cutting radii having displaced centers. At least two of the root surfaces are formed by cutting radii having lengths that are greater than the root truncation. The threads are used in a double start configuration to increase the connection strength and reduce makeup and breakout rotations.

19 Claims, 5 Drawing Sheets

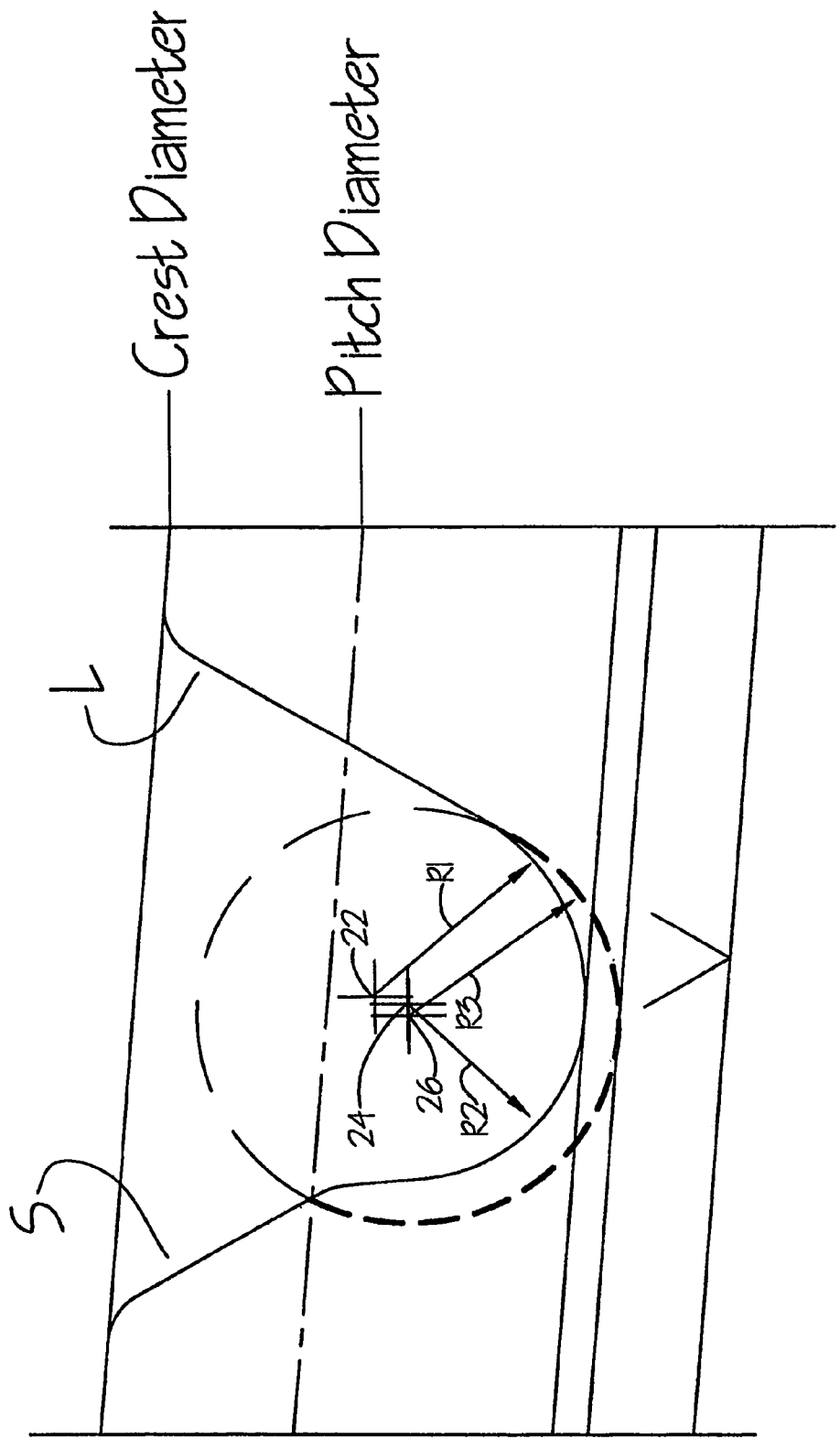

've also dictated by a desire to reduce the original thread shear area (base width of the thread form) preferably by not more than 25 percent.

The objectives of the '754 Patent were achieved by joining the unloaded thread flank (stab flank) to the thread root by a planar surface with the smaller radius curvature bridging the planar surface and the larger radius root surface.

The thread types of the '754 Patent are particularly well-suited to be employed as threaded connectors for use in drilling and producing oil and gas wells. Such connectors are assembled by rotating one of the pipe bodies relative to the other causing the threads to mate and engage with each other to hold the two pipe bodies together. When these connectors are used to assemble a drill pipe and other drilling assemblies, the connections are repeatedly made up and broken out as a part of the process of running the pipe into and out of the well. The speed of assembling and disassembling the connections and the amount of thread wear involved in the process are functions of the number of revolutions of the pipe required to effect full connection and release of the threaded components.

Thread make up speed and thread wear can be reduced by reducing the total amount of thread engagement required for a fully made up connection. The mechanical strength of the connection is, however, also reduced when the total thread engagement is reduced.

FAST MAKE-UP FATIGUE RESISTANT ROTARY SHOULDERED CONNECTION

CROSS REFERENCE TO RELATED APPLICATIONS

This application claims priority from U.S. provisional Patent Application No. 60/443,480 filed Jan. 29, 2003 and assigned to the Assignee of the present application. Patent Application No. 60/443,480 is incorporated herein, in its entirety, for all purposes.

BACKGROUND OF THE INVENTION

1. Field of the Invention

The present invention relates to thread forms and connections formed therewith for securing together components. More specifically, the present invention, in its preferred form, relates to thread forms used to secure together tubular bodies that are assembled to drill and produce wells.

2. Prior Art Setting of the Invention

The American Petroleum Institute (API) has standardized various thread forms that are used in the drilling and production of oil and gas wells. One API thread form commonly found in connections used to secure drill pipe together is a modified V-type thread that has a root radius of 0.038 in. The included angle between the stab and load flanks of the thread is 60 degrees and the thread root cutting radius of 0.038 in. is centered on the bisector of the included angle. The API connection provides a root truncation of the straight-V thread form of 0.038 in. where the root truncation is a measure of the distance between the apex of the 60 degree included angle and the thread root.

The performance of the API connection has been improved in the prior art by modifying the thread root configuration. One prior art improvement has been to increase the thread root radius from 00.038 in. to 0.042 in. Another prior art improvement has been to enlarge the root by forming different surfaces of revolution along the flank and adjoining root surfaces using different cutting radii centered on the stab flank side of the included angle bisector. This latter thread form is more fully described in U.S. Pat. Nos. 4,549,754 (the '754 Patent) and 6,467,818, assigned to the Assignee of the present invention, the disclosures of such patents being incorporated herein, in their entirety, for all purposes.

The preferred thread forms described in the '754 Patent provide for two different size root cutting radii with the larger of the cutting radii to be substantially larger than the root truncation. A specific illustrated form of the threads employs one cutting radius of 0.057 in. and another of 0.031 in. within a thread form having a usual root truncation of 0.038 in. as required for mating with an API connection. In the preferred configuration, the smaller radius represents approximately 54 percent of the length of the larger radius.

The '754 Patent recognizes that any increase of the root radius over root truncation will result in a decrease in maximum stress and that a substantial increase is preferred to obtain a substantial decrease in maximum stress. The '754 Patent proposes as a limit to the root radius increase that the root radius should not be increased to a point that is greater than a distance that would intersect or exceed the pitch diameter. The '754 Patent notes, however, that it is difficult to use this limit of enlarged root diameter in practice since it would tend to produce an under-cut area that would make it difficult to use standard cutting tools. The preferred thread form in the

SUMMARY OF THE INVENTION

One embodiment of the thread of the present invention has a thread root area defined by multiple surfaces of revolution. The multiple surfaces have different length cutting radii that are disposed on different centers on the stab flank side of the bisector of the included thread angle. Two of the radii have a length that is greater than the thread root truncation length and the ratio of the smaller to the larger radius length is at least 60 percent. The result is a thread form having greater fatigue resistance and increased strength as compared with prior art designs.

One form of the thread of the present invention provides thread roots having surfaces of revolutions formed with radii having lengths greater than the thread root truncation length with the ratio of the total thread height to the thread truncation length being less than 7. Threads produced with this combination of design features result in improved fatigue resistance and increased strength.

One example of a thread of the present invention provides thread roots having at least one surface of revolution formed with a cutting radius having a length that is greater than the length of a flat transition area on the stab flank joining the curving root area with the major portion of the linear stab flank area.

A specific thread form modified to employ each of these novel features of the present invention exhibited approximately twice the number of cycles to failure as compared with the unmodified thread form.

In one embodiment, a thread of the present invention is used as the thread form in the pin and/or box of a double start threaded connector. The double start connector thread is formed by providing two helically developed thread teeth of the present invention side-by-side on each of the pin and/or the box components of the connector. The two thread teeth are axially separated on the connector component with independent starting and runout points that start at the same axial position, shifted by 180 degrees from each other. The thread teeth of one component of the connector are designed to engage in the recess formed between adjacent helical turns of the two helically extending thread teeth formed on the mating component of the connector.

The double start design permits the pin and box components of the connector to be threadedly engaged and disengaged with each other with only half the number of revolutions relative to each other as is required for engaging and disengaging a connector having a single start thread. The reduction in the revolutions required to make up a double start thread design is beneficial in reducing wear experienced by the connector. The reduced number of turns required to make up or break out the connection also reduces the time required to assemble and disassemble strings of pipe being used in the drilling and completion of wells. These features are especially advantageous when applied to connectors that must be frequently made up and broken out such as is the case with drill strings and work strings used in the drilling and construction of wells.

In one form of the invention, the taper of the box is greater than the taper of the pin. The pitch lines of the pin and box cross each other and diverge from the crossing point toward the external make up shoulder. The pitch diameter on the box is larger than the pitch diameter on the pin. A preferred form of the invention is used with rotary shouldered connectors having a double start thread and internal and external shouldering points.

BRIEF DESCRIPTION OF THE DRAWINGS

FIG. 3 is an enlarged partial cross sectional view of a thread form of the present invention overlaying a variation of the prior art thread form;

DESCRIPTION OF THE ILLUSTRATED EMBODIMENTS

Figure 1:
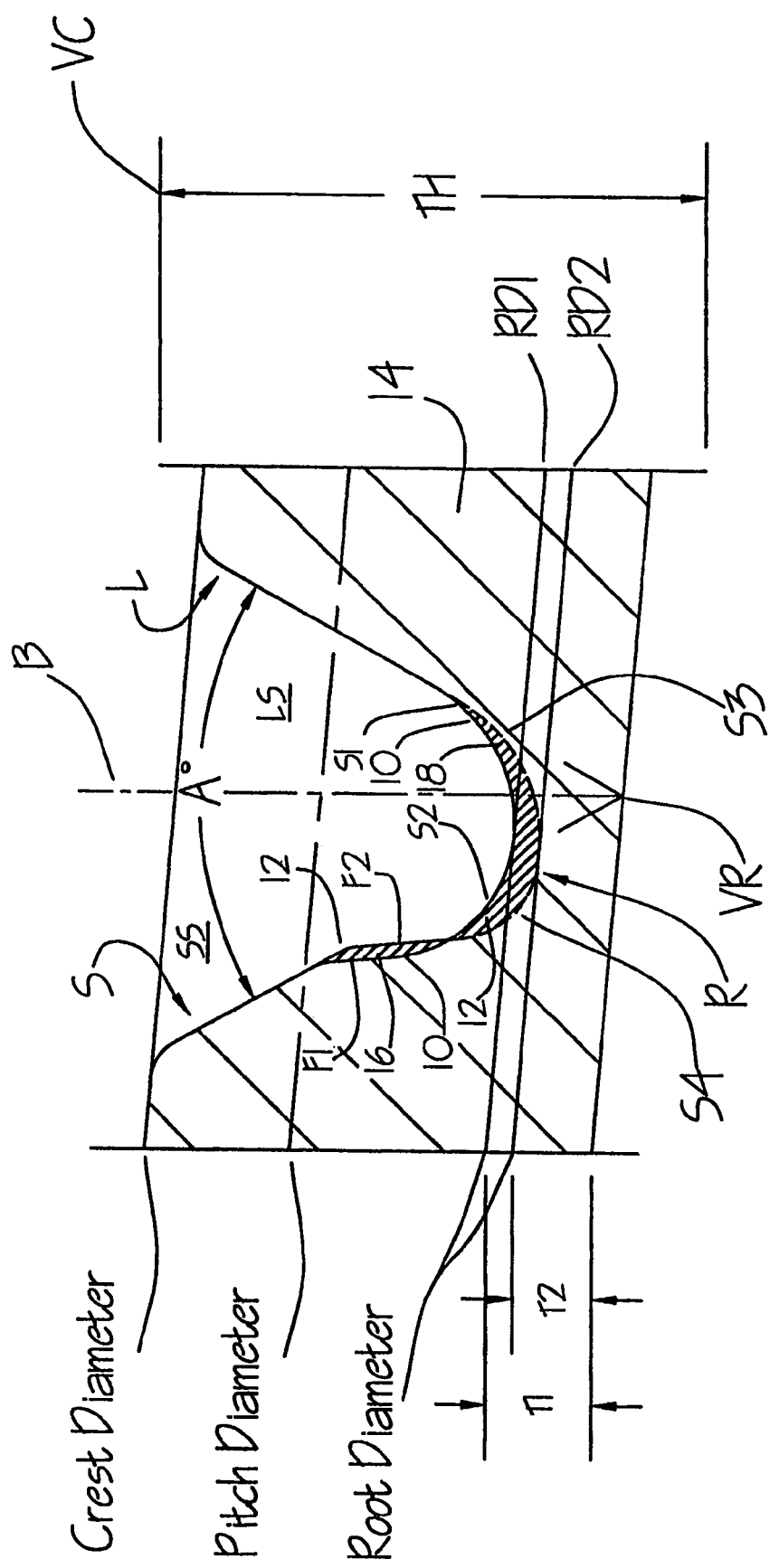
FIG. 1 is an enlarged, partial cross sectional view of a thread form of the present invention overlaying a prior art thread form.
Figure 2:
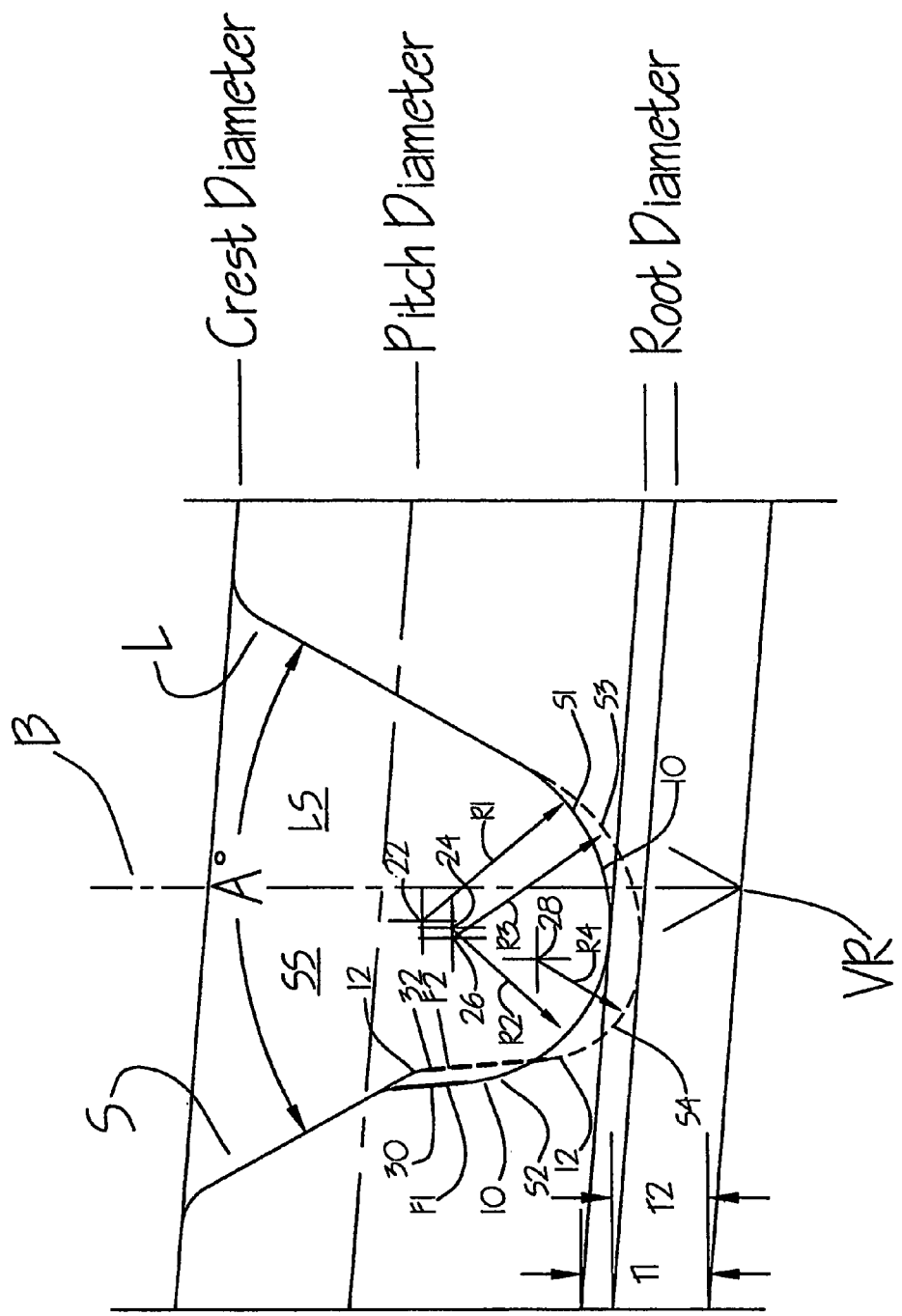
FIG. 2 is an alternate depiction of FIG. 1 illustrating an enlarged, partial cross sectional view of a thread form of the present invention overlying the prior art thread form.
Figure 5:
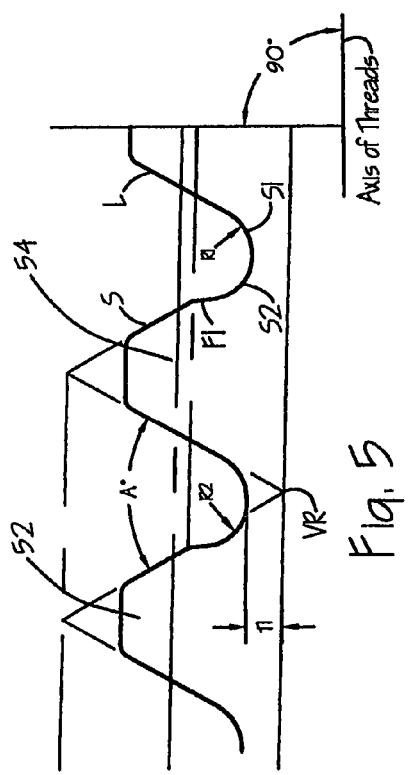
FIG. 5 is an enlarged sectional view illustrating details in the thread configuration of the pin of FIG. 4.

FIGS. 1 and 2 illustrate the profile of a thread form of the present invention, indicated at 10, overlaying a thread form of the prior art, indicated at 12. The threads are shown formed as external threads on a pin body 14. The reference character 10 has been applied to the thread profile of the present invention in each segment isolated by its intersection with the prior art thread form 12. The prior art thread form has been designated with the reference character 12 at each point that it has been isolated by its intersection with the thread form 10 of the present invention. In FIG. 1, the area of the prior art thread form that is removed by the thread form of the present invention is identified by the crosshatched area 16. The area of the thread form of the present invention that is removed by the prior art thread form is identified by the crosshatched area 18.

FIG. 2 designates the profile of the prior art thread form with a dashed line and that of the present invention with a solid line.

For purposes of the present description, and with reference to FIGS. 1 and 2, the thread forms will be described with general reference to a stab flank S, a load flank L, a root area R, a root vertex VR and a crest vertex VC. The root vertex and crest vertex are formed by the extension of the major linear stab flank and load flank surfaces. Total thread height is the radial vertex separation indicated by a length TH between the root vertex VR and the crest vertex VC measured along a line perpendicular to the axis of the pipe. The stab flank S and load flank L converge at the root vertex VR to define an included angle A. A line B bisecting the included angle A divides the gap into a stab flank side SS and a load flank side LS. The distance, measured along the bisector line B between the root diameter RD of a thread root and the thread root vertex VR is the root truncation RT.

The stab flank is the face of the thread tooth on one component of the connection that first contacts the mating thread tooth of the second component of the connection when the two separated threaded components are first advanced together for threaded assembly. The load flank is the face of the thread tooth that opposes the stab flank across the thread root gap. The load flank carries the increasing load provided by a tension force attempting to separate the two mated components. Unless otherwise noted, the terms used in this description follow the API convention.

Referring to FIGS. 2 and 3, the root of the thread form of the present invention 10 is formed by two surfaces of revolution S1 and S2 defined by cutting radii R1 and R2, respectively, centered on center points 22 and 24, respectively. The cutting radius R1 is a load flank radius and the cutting radius R2 is a stab flank radius The radii centers 22 and 24 are disposed on the stab flank side of the bisector B of the included angle A defined in the gap between the major stab flank S and the major load flank L. The surface of revolution S2 is joined to the linear portion of the major stab flank S with a linear flat transition section F1 that is tangent to the surface of revolution S2 and makes an angular intersection with the linear portion of the major stab flank S. The linear section of the major load flank L intersects the surface of revolution S1 at a tangent point. The root truncation for the thread form 10 is indicated by the length T1 measured between the root diameter RD1 and the root vertex VR.

The root of the prior art thread form 12 is formed by two surfaces of revolution S3 and S4 that are defined by a load flank cutting radius R3 and a stab flank cutting radius R4. The cutting radii also have radial center points 26 and 28, respectively, on the stab flank side of the bisector B. The prior art thread form 12 includes a linear flat transition section F2 that extends from a tangent point on the surface S4 to the major linear portion of the stab flank S. The surface of revolution S4 connects at a tangent point to the major linear section of the load flank L. The root truncation for the thread form 12 is indicated by the length T2 measured between the root diameter RD2 and the root vertex VR.

The thread form 10 exhibits substantially improved fatigue resistance and strength characteristics over the prior art design 12, in part, because of the amount of curvature within the thread root relative to the linear flat transition sections, the amount of root truncation and the radius of curvature in a critical area of the thread root. In the illustrations of FIGS. 1 and 2, the radii R1 and R2 and the transition flat F1 of the present invention cooperate to form a thread root having a composite configuration that disperses stresses over a larger area than that of the prior art thread form. The transition zone of the thread form 10 from the major root curvature area to the primary stab flank area is increased relative to that of the prior art thread form. The short radius R4 of the prior art thread form produces a sharper curvature that concentrates stresses. The root truncation of the present invention is greater than that of the prior art design. The increase in root truncation improves the connection strength by increasing the amount of metal underlying the root of the last engaged pin thread. Each of these parameters, as disclosed herein, acting both independently and in the described combination produce a thread form exhibiting significantly superior characteristics.

The '754 Patent recognizes the benefit of providing a large curving root radius in a thread form. FIG. 3 illustrates the prior art thread form with a thread root cutting radius R3 exhibiting the hypothetical maximum amount of curvature consistent with the teaching of the patent. The use of the hypothetical maximum radius root thread form was not considered practical for the reasons stated in the '754 Patent. The inventors of the '754 Patent also considered it necessary to smooth the transition from the single large root radius R3 by adding a second substantially smaller radius R4 and a connecting flat transition segment F2.

The thread form of the present invention establishes a relationship between radii length, stab flank flat transition length and root truncation length that overcomes limitations of the prior art and results in a significantly improved connection. Each of the variables, acting alone, contributes to the improved connection. The combination of the features produces a synergism that produces unexpectedly high fatigue resistance and improved strength as compared with an unmodified thread form of the same basic configuration.

In accordance with the teachings of the present invention, it has been determined that:

The ratio of the total thread height (TH) to the root truncation (T) of one root should be less than 7:

$$TH/T<7.$$

The ratio of the stab flank radius R2 to the load flank radius R1 should be greater than 0.6:

$$R2/R1>0.6.$$

The ratio of the stab flank radius R2 to the tangent flat length F1 should be greater than 1:

$$R2/F1>1.$$

In a preferred form of the present invention, a thread form employing a flat length F1 of 0.0180 in., a radius R1 of 0.057 in. and a radius R2 of 0.050 in. was employed with a root truncation of 0.042 in. and an included angle of A=60 degrees. The thread form 10 maybe advantageously applied to a threaded connection as either the pin or box thread, or both.

Figure 4:
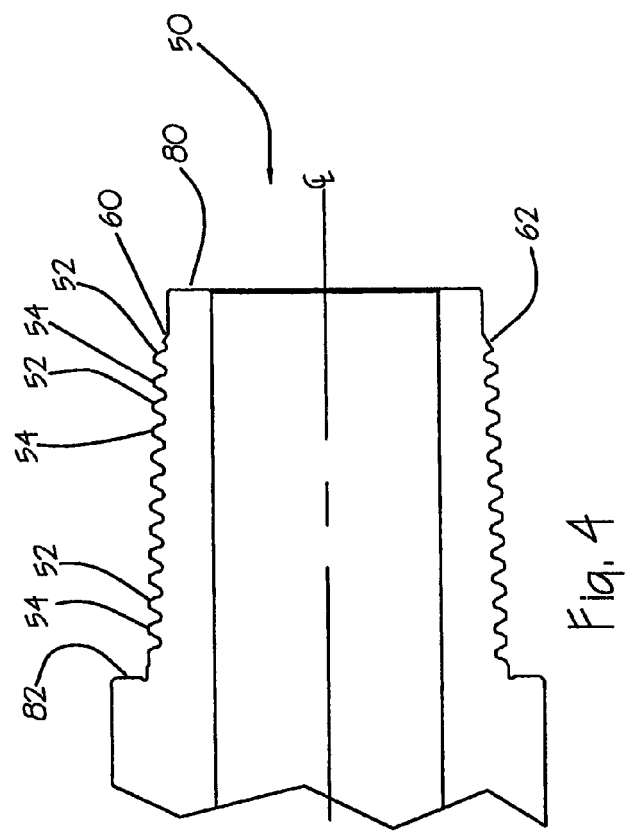
FIG. 4 is a vertical cross sectional view of a rotary shouldered pin equipped with a double start thread form of the present invention.
Figure 7:
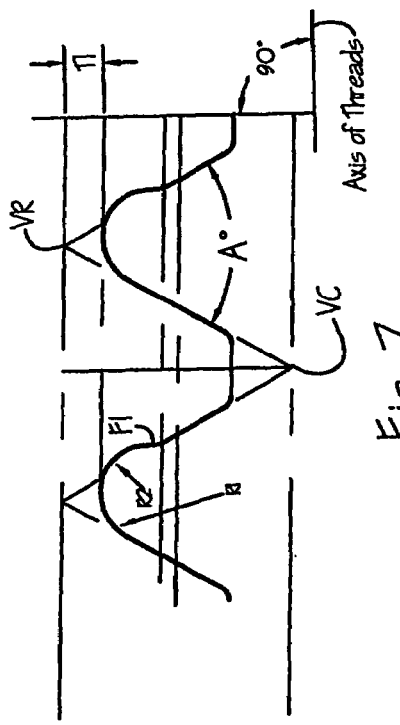
FIG. 7 is an enlarged sectional view illustrating details in the thread configuration of the box of FIG. 6.

In one embodiment of the present invention, the thread form is applied to the pin and box of a rotary shouldered connection having a double start thread such as illustrated in FIGS. 4-7. The pin of such a connection, indicated generally at 50 in FIG. 4, is provided with two helically developed thread teeth 52 and 54 disposed side-by-side. The two thread teeth 52 and 54 are axially separated on the pin component with independent starting and runout points that start at the same axial position, shifted by 180 degrees from each other. Thus, the thread 52 maybe considered to start at the point 60 and the thread 54 may be considered to start at the point 62, which is 180 degrees opposite the point 60.

Figure 6:
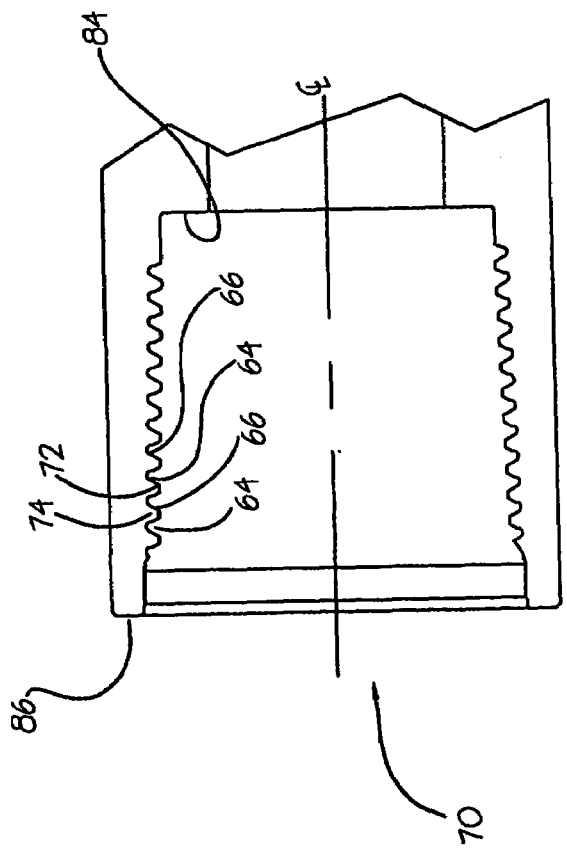
FIG. 6 is a vertical cross sectional view of a rotary shouldered box equipped with a double start thread form of the present invention designed to mate with the pin of FIG. 4.

The thread teeth 52 and 54 are designed to engage in the recesses 64 and 66, respectively of the box 70 illustrated in FIG. 6. The recesses 64 and 66 are formed between adjacent helical turns of two helically extending thread teeth 72 and 74 formed on the box. The thread forms illustrated in FIGS. 5 and 7 correspond in shape and relative dimensions to the thread form 10 of the present invention as described with reference to FIGS. 1-3. Corresponding identification indicia are employed in all of the drawings to identify the same or equivalent components.

The pin 50 may be provided with an internal shoulder 80 and an external shoulder 82. The pin shoulders 80 and 82, respectively engage the internal shoulder 84 and the external shoulder 86 of the box 70. At the final make up position of the engaged pin and box connectors, the internal and external shoulders come into abutting engagement.

In a double start thread such as illustrated in FIGS. 4-7, the angle of the helix is greater than that of a single start thread. As a result, there is a reduction in the perpendicular notch affect that is normally present in a single start thread. Since there is a lower normal incident force, there is a reduction in the fatigue generation within thread components during the make up and use of the connection. Thus, by increasing the helix, the resultant stresses acting axially between the pin and box threads are moved off of the perpendicular to reduce the stress exerted in the connection.

A double-start thread is easier to break out than a single start thread. While the initial torque required to break the connection is the same in a double start as in a single start thread, once the connection is broken, the torque required to continue the break out is sharply reduced as compared with that of a single start thread.

In addition to allowing for faster make up and break out speeds, a double start thread increases torsional strength of a tool joint as the P/pi component in a screw jack formula doubles. The double start thread improves fatigue resistance of a tool joint by increasing the helix (or lead) angle at a critical section.

In the preferred form of the present invention, different tapers are provided on the pin and the box to provide a more uniform load distribution in the threads, reducing the stress level at the last engaged thread of the pin, which enhances fatigue life of the connection.

Although the invention has been described in detail with reference to a specific preferred embodiment, from the foregoing description it will readily become apparent to those skilled in the art that many and varied changes can be made without departing from the spirit and scope of the invention.

The invention claimed is:

1. A thread form for securing together mating threaded components, comprising:
   a stab flank,
   a load flank,
   a thread root connecting said stab flank and said load flank whereby said stab flank and said load flank define an included angle in the gap bridged by said thread root,
   a thread root truncation length measured along the bisector of the included angle between the thread root and the apex of the included angle,
   a first surface of revolution having a first radial length included in said thread root,
   a second surface of revolution having a second radial length included in said thread root, said first radial length being greater than said second radial length,
   centers of revolution for said first and second surfaces of revolutions being disposed on the stab flank side of a bisector of the included angle, said first radial length and said second radial length each being greater than said thread root truncation length with the ratio of said second radial length to said first radial length being at least 0.6, wherein this is a stab flank flat surface lying at an angle different than said stab flank, said stab flank flat connecting said second surface of revolution with said stab flank, and said second radial length being greater than the length of said stab flank flat surface.

2. A thread form, as defined in claim 1, wherein said thread form has a ratio of total thread height to root truncation of less than 7.

3. A thread form having a total thread height for securing together mating threaded components, comprising:

a stab flank having a linear stab flank surface, a load flank having a linear load flank surface, a thread root surface connecting said linear stab flank surface and said linear load flank surface whereby said linear stab flank surface and said linear load flank surface define an included angle in a gap bridged by said thread root surface, a first surface of revolution, defined by a first radial length, included in said thread root surface, a second surface of revolution, defined by a second radial length, included in said thread root surface, said first radial length being greater than said second radial length, first and second centers of revolution for said first and second radial lengths being disposed on the stab flank side of a bisector of said included angle, said thread form having a total thread height less than 7 times as great as its root truncation length, wherein there is a stab flank flat surface lying at an angle different than said linear stab flank surface said stab flank flat surface connecting said second surface of revolution with said linear stab flank surface, and said second radial length being greater than the length of said stab flank flat surface.

4. A thread form as defined in claim 3, comprising:

said first radial length and said second radial length each being greater than said thread root truncation length with the ratio of said second radial length to said first radial length being at least 0.6.

5. A thread form for securing together mating threaded components, comprising:

a helically developed thread tooth extending axially over a central thread axis, a stab flank having a first linear stab flank surface, a load flank having a linear load flank surface, a thread root surface connecting said first linear stab flank surface and said linear load flank surface whereby said first linear stab flank surface and said linear load flank surface define an included angle in a gap bridged by said thread root surface, a first surface of revolution, defined by a first radial length, included in said thread root surface, a second surface of revolution, defined by a second radial length, included in said thread root surface, said first radial length being greater than said second radial length, first and second centers of revolution for said first and second radial lengths, respectively, being disposed on the stab flank side of a bisector of the included angle, a second stab flank surface comprising a linear flat lying along an angle different than said first linear stab flank surface, said second stab flank surface connecting said second surface of revolution with said second linear stab flank surface, said second radial length being greater than the length of said second stab flank surface, and said first radial length and said second radial length each being greater than a thread root truncation length of said thread form with the ratio of said second radial length to said second radial length being at least 0.6.

6. A thread form as defined in claim 5, wherein said thread form has a ratio of total thread height to root truncation of less than 7.

7. A connector having a multi-start thread configuration wherein at least one thread of the configuration comprises:

a stab flank, a load flank, a thread root connecting said stab flank and said load flank whereby said stab flank and said load flank define an included angle in the gap bridged by said thread root, a thread root truncation length measured along the bisector of the included angle between the thread root and the apex of the included angle, a first surface of revolution having a first radial length included in said thread root, a second surface of revolution having a second radial length included in said thread root, said first radial length being greater than said second radial length, centers of revolution for said first and second surfaces of revolutions being disposed on the stab flank side of a bisector of the included angle, said first radial length and said second radial length each being greater than said thread root truncation length with the ratio said second radial length to said first radial length being at least 0.6, wherein this is a stab flank flat surface lying at an angle different than said stab flank, said stab flank flat connecting said second surface of revolution with said stab flank, and said second radial length being greater than the length of said stab flank flat surface.

8. A connector as defined in claim 7 wherein said thread form has a ratio of total thread height to root truncation of less than 7.

9. A connector as defined in claim 8, comprising:

a stab flank flat surface lying at an angle different than said stab flank, said stab flank flat connecting said first surface of revolution with said stab flank, and said second radial length being greater than the length of said stab flank flat surface.

10. A connector as defined in claim 7 further comprising internal and external shoulders.

11. A connector as defined in claim 7 wherein said connector comprises a a pin and a box wherein said thread is provided for each thread of said multi start thread configuration for both said pin and box.

12. A connector as defined in claim 11, further comprising internal and external shoulders formed in each of said pin and box.

13. A connector as defined in claim 11 wherein said thread has a first radial length of 0.057 in. and a second radial length of 0.050 in.

14. A connector as defined in claim 13 wherein said thread has a total thread height of 0.247 in. and a root truncation length of 0.042 in.

15. A connector as defined in claim 14 wherein said thread has a first radial length of 0.057 in. and a stab flank flat surface of 0.0180 in.

16. A connector as defined in claim 15 wherein the taper of the box is 0.75 in. per foot on the diameter and the taper of the pin is 0.68 in. per foot on the diameter.

17. A connector as defined in claim 11 wherein said thread has a total thread height of 0.247 in. and a root truncation length of 0.042 in.

18. A connector as defined in claim 11 wherein said thread has a first radial length of 0.057 in. and a stab flank flat surface of 0.0180 in.

19. A connector as defined in claim 11 wherein the taper of the box is 0.75 in. per foot on the diameter and the taper of the pin is 0.68 in. per foot on the diameter.

* * * * *